(12) United States Patent
Shibahara et al.

(10) Patent No.: US 11,446,895 B2
(45) Date of Patent: Sep. 20, 2022

(54) DECORATIVE FILM AND ARTICLE TO WHICH THE SAME IS ADHERED

(71) Applicant: 3M INNOVATIVE PROPERTIES COMPANY, St. Paul, MN (US)

(72) Inventors: Norihito Shibahara, Tokyo (JP); Rie Sakai, Tokyo (JP); Ryo Chiba, Shizuoka (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/317,663

(22) PCT Filed: Jul. 25, 2017

(86) PCT No.: PCT/US2017/043640
§ 371 (c)(1),
(2) Date: Jan. 14, 2019

(87) PCT Pub. No.: WO2018/022568
PCT Pub. Date: Feb. 1, 2018

(65) Prior Publication Data
US 2019/0224941 A1    Jul. 25, 2019

(30) Foreign Application Priority Data
Jul. 29, 2016    (JP) .............................. JP2016-150713

(51) Int. Cl.
*B32B 3/30*    (2006.01)
*B29D 11/00*    (2006.01)
(Continued)

(52) U.S. Cl.
CPC .......... *B32B 3/30* (2013.01); *B29D 11/00605* (2013.01); *B32B 3/28* (2013.01);
(Continued)

(58) Field of Classification Search
CPC .. B32B 3/30; B32B 7/12; B32B 15/08; B32B 2255/205; B32B 2307/412;
(Continued)

(56) References Cited

U.S. PATENT DOCUMENTS

| 5,670,096 A | * | 9/1997 | Lu | ............................ B29C 35/08 264/1.1 |
| 2019/0009963 A1 | * | 1/2019 | Wessely | .................. B32B 27/08 |

FOREIGN PATENT DOCUMENTS

| FR | 2 516 202 | 5/1983 |
| JP | H 3-50427 U | 5/1991 |

(Continued)

OTHER PUBLICATIONS

Machine Translation of JP 2013-159000 (A). (Year: 2013).*
(Continued)

*Primary Examiner* — Brian Handville
(74) *Attorney, Agent, or Firm* — Philip P. Soo

(57) ABSTRACT

A decorative film that exhibits visual effects such as, e.g., stereoscopic effect, luxurious feel, and the like; and can also exhibit complex flip-flop properties that have expansion, depth, fluctuation, and the like, and whereby a pattern can be made visible or invisible depending on the viewing angle. In one embodiment, the decorative film can include, in order, a base layer and, adjacent to the base layer, a brightening layer having a concavo-convex surface; or a brightening base layer including a brightening material and having a concavo-convex surface; adjacent to the brightening layer or the brightening base layer, a transparent resin layer; and, adjacent to the transparent resin layer, a semi-transparent metallic layer.

20 Claims, 4 Drawing Sheets

(51) Int. Cl.
    *B32B 3/28*         (2006.01)
    *B32B 7/12*         (2006.01)
    *B32B 15/08*       (2006.01)
    *B05D 3/12*         (2006.01)
    *B05D 7/00*         (2006.01)
    *B05D 5/06*         (2006.01)

(52) U.S. Cl.
    CPC ............... *B32B 7/12* (2013.01); *B32B 15/08* (2013.01); *B05D 3/12* (2013.01); *B05D 5/066* (2013.01); *B05D 7/57* (2013.01); *B32B 2255/205* (2013.01); *B32B 2307/412* (2013.01); *B32B 2451/00* (2013.01)

(58) Field of Classification Search
    CPC ....... B32B 2451/00; B32B 3/28; B32B 7/022; B32B 7/023; B32B 7/03; B32B 27/08; B32B 2255/26; B32B 2255/10; B32B 2307/416; B32B 2307/514; B32B 2307/51; B05D 3/12; B05D 5/066; B05D 7/57; B29D 11/00605
 See application file for complete search history.

(56) References Cited

FOREIGN PATENT DOCUMENTS

| | | |
|---|---|---|
| JP | H11-277683 | 10/1999 |
| JP | 2005-014374 | 1/2005 |
| JP | 2005-214169 | 7/2005 |
| JP | 2005-262447 | 9/2005 |
| JP | 2006-35540 | 2/2006 |
| JP | 2007-054998 | 3/2007 |
| JP | 2007-171235 | 6/2007 |
| JP | 2012-22126 | 2/2012 |
| JP | 2013109000 A * | 6/2013 |
| JP | 2013-159000 | 8/2013 |
| JP | 2013-5109000 | 8/2013 |
| WO | WO 1992/08998 | 5/1992 |
| WO | WO 2007/040284 | 4/2007 |
| WO | WO 2016/126571 | 8/2016 |

OTHER PUBLICATIONS

Machine Translation of JP 2013-109000-A (Year: 2013).*
Machine Translation of JP H11-277683A. (Year: 1998).*
International Appl. No. PCT/US2017/043640 International Search Report dated Nov. 7, 2017 (7 pages).

* cited by examiner

DECORATIVE FILM AND ARTICLE TO WHICH THE SAME IS ADHERED

CROSS REFERENCE TO RELATED APPLICATIONS

This application is a national stage filing under 35 U.S.C. 371 of PCT/US2017/043640, filed 25 Jul. 2017, which claims the benefit of Japanese Application No. 2016-150713, filed 29 Jul. 2016, the disclosures of which are incorporated by reference in their entirety herein.

TECHNICAL FIELD

The present disclosure relates to a decorative film and an article to which the same is adhered.

BACKGROUND ART

Decorative films of diverse designs are used across a wide range of fields including for interior materials of automobiles and the like. One design that has been proposed is a decorative film that changes appearance due to stereoscopic effect and/or the angle of viewing.

Japanese Unexamined Patent Application Publication No. 2005-014374 describes a decorative film in which a lustrous pattern (convexities and concavities) is formed on a top surface of a transparent or opaque first synthetic resin film, and a transparent second synthetic resin film made from one layer or a plurality of layers is laminated on the pattern.

Japanese Unexamined Patent Application Publication No. 2013-159000) describes a metallic tone decorative sheet with flip-flop properties in which a first thermoplastic resin transparent resin layer, a first metal layer, a colorant-added adhesive layer, a second thermoplastic resin transparent resin layer, a second metal layer, an adhesive layer, and a thermoplastic resin sheet layer are laminated sequentially; the visible light transmission of a composite film constituted by the first thermoplastic transparent resin layer and the first metal layer is not less than 20% and not greater than 60%, and the visible light transmission of a composite film constituted by the second thermoplastic transparent resin layer and the second metal layer is not greater than 30%.

SUMMARY OF INVENTION

While visual effects such as stereoscopic effect and luxurious feel can be exhibited with decorative films including a conventional brightening layer that has a concavo-convex surface therein, visual change is poor. Additionally, while appearance effects such as color appearance and disappearance depending on the angle of viewing can be exhibited by conventional decorative films that exhibit flip-flop properties, the layer providing the color is flat and, as such, monotonic flip-flop properties that a surface highly-reflective only in one direction can provide are expressed.

In recent years, demand for diversity in designs in decorative films has increased. Conventional decorative films exhibit change in appearance due to stereoscopic effect and angle, but there is a desire for decorative films that can provide more complex visual effects that are full of variety.

These decorative films are applied to automobile interior parts and other articles using methods such as insert molding (IM), three-dimensional overlay method (TOM), and the like, but when applying the decorative film, heating and, as necessary, deformation of the film occurs. As a result, the concavo-convex shape of the decorative film may become deformed or lost, and it may be impossible to exhibit the intended visual effects of the decorative film.

The present disclosure provides a decorative film that can exhibit stereoscopic effect and flip-flop properties more complex than those provided by the conventional technologies having expansion, depth, fluctuation, and the like.

The present disclosure provides a decorative film capable of being applied to adherends of various shapes and by various application methods, and that can exhibit stereoscopic effects and flip-flop properties more complex than those provided by the conventional technologies having expansion, depth, fluctuation, and the like.

According to an embodiment of the present disclosure, a decorative film is provided that includes a base layer; a brightening layer having a concavo-convex surface, as a separate body on the base layer or as a single body with the base layer; a transparent resin layer on or above the brightening layer; and a semi-transparent metallic layer having a substantially flat surface shape, on or above the transparent resin layer, wherein the decorative film exhibits flip-flop properties.

According to another embodiment of the present disclosure, an article is provided by disposing the decorative film described above on a base article.

According to another embodiment of the present disclosure, a method for manufacturing a decorative film is provided that includes the steps of providing a transparent resin layer having a concavo-convex surface by applying a die having an emboss pattern to a first major surface of a transparent resin layer having first and second major surfaces; applying a brightening layer to the concavo-convex surface of the transparent resin layer; forming a base layer on the brightening layer by coating; and applying a semi-transparent metallic layer to the second major surface of the transparent resin layer. In this method, the step of applying the semi-transparent metallic layer is a step of directly applying the semi-transparent metallic layer to the second major surface or is a step of applying the semi-transparent metallic layer to the second major surface via a transparent resin layer different from the transparent resin layer.

According to another embodiment of the present disclosure, a method for manufacturing a decorative film is provided that includes the steps of providing a transparent resin layer having a concavo-convex surface by applying a die having an emboss pattern to a first major surface of a transparent resin layer having first and second major surfaces; forming a brightening base layer including a brightening material on the concavo-convex surface of the transparent resin layer by coating; and applying a semi-transparent metallic layer to the second major surface of the transparent resin layer. In this method, the step of applying the semi-transparent metallic layer is a step of directly applying the semi-transparent metallic layer to the second major surface or is a step of applying the semi-transparent metallic layer to the second major surface via a transparent resin layer different from the transparent resin layer.

According to the present disclosure, a decorative film is provided that can exhibit visual effects such as stereoscopic effect and the like; and can also exhibit complex flip-flop properties that have expansion, depth, fluctuation, and the like, and whereby a pattern can be made visible or invisible depending on the viewing angle.

The above descriptions should not be construed to be a disclosure of all of the embodiments and benefits of the present invention.

DESCRIPTION OF EMBODIMENTS

Figure 1:
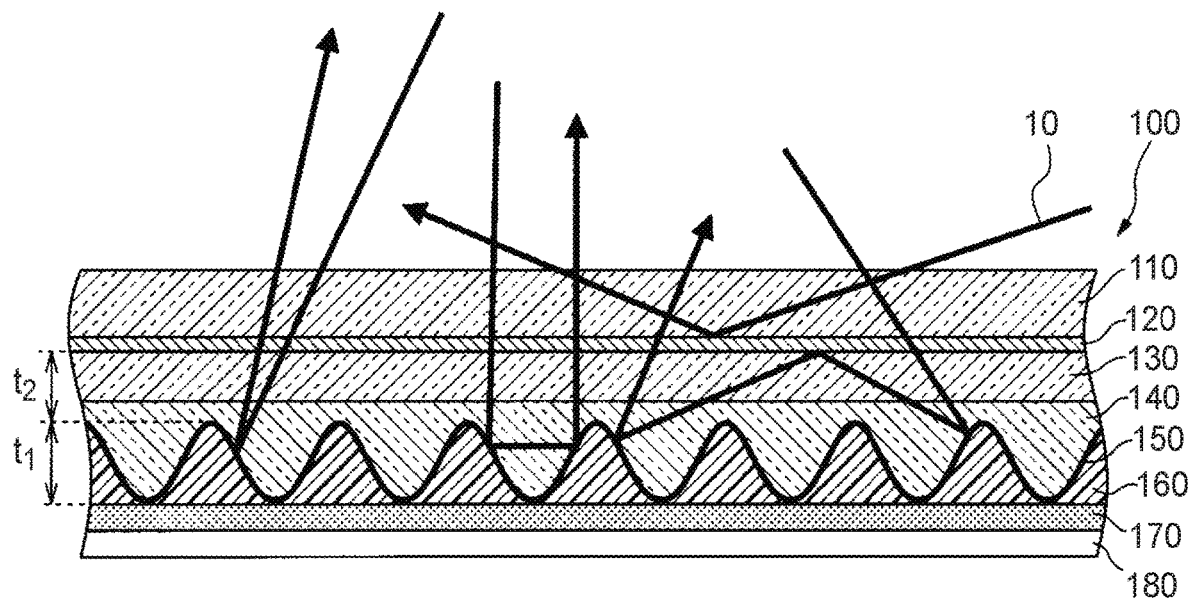
FIG. 1 is a cross-sectional view of a decorative film according to an embodiment of the present disclosure.

A decorative film of the present disclosure can exhibit stereoscopic effect and flip-flop properties. The decorative film includes a base layer; a brightening layer having a concavo-convex surface, as a separate body on the base layer or as a single body with the base layer; a transparent resin layer on or above the brightening layer; and a semi-transparent metallic layer having a substantially flat surface shape, on or above the transparent resin layer.

The decorative film of a first embodiment includes a base layer; a brightening layer having a concavo-convex surface, as a separate body on the base layer; a transparent resin layer on or above the brightening layer; and a semi-transparent metallic layer having a substantially flat surface shape, on or above the transparent resin layer. As a result of this configuration, visual effects such as stereoscopic effect and the like; and complex flip-flop properties that have expansion, depth, fluctuation, and the like, and whereby a pattern can be made visible or invisible depending on the viewing angle can be simultaneously exhibited.

The decorative film of a second embodiment includes a base layer; a brightening layer having a concavo-convex surface, a single body with the base layer; a transparent resin layer on or above the brightening layer; and a semi-transparent metallic layer having a substantially flat surface shape, on or above the transparent resin layer. As a result of this configuration, visual effects such as stereoscopic effect and the like; and complex flip-flop properties that have expansion, depth, fluctuation, and the like, and whereby a pattern can be made visible or invisible depending on the viewing angle can be simultaneously exhibited.

With the decorative film of the first embodiment, a visible light transmission of the semi-transparent metallic layer may be set to from 10 to 70%. When the visible light transmission is within this range, excellent flip-flop properties can be provided.

With the decorative film of the second embodiment, a visible light transmission of the semi-transparent metallic layer may be set to from 15 to 75%. When the visible light transmission is within this range, excellent flip-flop properties can be provided.

With the decorative film of the first embodiment, a thickness of the brightening layer may be set to from 10 nm to 100 μm. When the thickness is within this range, light reflectivity and opacity can be increased and, as a result, a decorative film can be obtained that has excellent visual effects such as stereoscopic effect and luxurious feel and excellent flip-flop properties.

With the decorative film of the first or second embodiment, a depth of the concavo-convex surface may be set to from 1 μm to 100 μm. The depth of the concavo-convex surface affects the reflectivity and scattering of light. When the depth is within this range, a decorative film can be obtained that has excellent visual effects such as stereoscopic effect and luxurious feel and excellent flip-flop properties.

With the decorative film of the first or second embodiment, a thickness of the transparent resin layer from a convex apex of the concavo-convex surface to a bottom surface of the semi-transparent metallic layer may be set to from 10 to 500 μm. When the depth is within this range, a decorative film can be obtained that has excellent visual effects such as stereoscopic effect and luxurious feel and excellent flip-flop properties.

With the decorative film of the first embodiment, a metal thin film including a metal selected from aluminum, nickel, gold, platinum, chromium, iron, copper, tin, indium, silver, titanium, lead, zinc, and germanium, or an alloy or compound of the same may be used for the brightening layer. The reflectivity of light and/or color tone of such a material is excellent and, as a result, a decorative film can be provided that has excellent visual effects such as stereoscopic effect and luxurious feel and excellent flip-flop properties.

With the decorative film of the second embodiment, an aluminum brightening material or a pearl brightening material may be used for the brightening material. The reflectivity of light and/or color tone of such a brightening material is excellent and, as a result, a decorative film can be provided that has excellent visual effects such as stereoscopic effect and luxurious feel and excellent flip-flop properties.

The decorative film of the first or second embodiment may further include a protective layer on or above the semi-transparent metallic layer. By applying the protective layer, performance such as surface protecting performance, barrier properties, weather resistance, antifouling properties, and the like can be imparted to the decorative film, and visual effects such as stereoscopic effect and luxurious feel can be enhanced.

With the decorative film of the first or second embodiment, a storage modulus of at least one of the base layer or the brightening base layer, the transparent resin layer, and the optional protective layer may be set to from $1\times10^6$ Pa to $1.5\times10^8$ Pa in a temperature range of 110° C. to 150° C. when measured under conditions of a frequency of 10 Hz and stretching mode. When the storage modulus of these layers is within this range, defects can be prevented such as deformation, loss, damage or the like of the concavo-convex shape caused by stress and/or heat applied to the decorative film. Accordingly, the decorative film can be particularly advantageously used in applications where the decorative film is applied to a three-dimensional adherend by insert molding (IM) method, and a three-dimensional overlay method (TOM) such as a vacuum-pressure molding method, or the like. The storage modulus of all of the base layer or the brightening base layer, the transparent resin layer, and the optionally present protective layer are preferably within the range described above.

With the decorative film of the first or second embodiment, the transparent resin layer may include a first transparent resin layer having substantially flat first and second surfaces that is adjacent to the semi-transparent metallic layer; and a second transparent resin layer that is on or above the first transparent resin layer, and that has a first surface adjacent to the concavo-convex surface and a substantially flat second surface. As a result of this laminar structure, the laminate structure of the brightening layer having a concavo-convex surface and the semi-transparent metallic layer can be more easily formed.

Additionally, a design layer can be formed on the substantially flat first transparent resin surface or between the first transparent resin layer and the second transparent resin layer by a variety of methods. By providing the design layer, the design of the decorative film can be further enhanced.

By applying the decorative film of the first or second embodiment on a base article, an article can be provided that exhibits visual effects such as stereoscopic effect and flip-flop properties whereby a pattern can be made visible and invisible depending on the viewing angle.

A method for manufacturing the decorative film of the first embodiment includes the steps of providing a transparent resin layer having a concavo-convex surface by applying a die having an emboss pattern to a first major surface of a transparent resin layer having first and second major surfaces; applying a brightening layer to the concavo-convex surface of the transparent resin layer; forming a base layer on the brightening layer by coating; and applying a semi-transparent metallic layer to the second major surface of the transparent resin layer. In this method, the step of applying the semi-transparent metallic layer is a step of directly applying the semi-transparent metallic layer to the second major surface or is a step of applying the semi-transparent metallic layer to the second major surface via a transparent resin layer different from the transparent resin layer.

A method for manufacturing the decorative film of the second embodiment includes the steps of providing a transparent resin layer having a concavo-convex surface by applying a die having an emboss pattern to a first major surface of a transparent resin layer having first and second major surfaces; forming a brightening base layer including a brightening material on the concavo-convex surface of the transparent resin layer by coating; and applying a semi-transparent metallic layer to the second major surface of the transparent resin layer. In this method, the step of applying the semi-transparent metallic layer is a step of directly applying the semi-transparent metallic layer to the second major surface or is a step of applying the semi-transparent metallic layer to the second major surface via a transparent resin layer different from the transparent resin layer.

By using these manufacturing methods, a decorative film can be provided that exhibits visual effects such as stereoscopic effect and flip-flop properties whereby a pattern can be made visible and invisible depending on the viewing angle, and whereby excellent manufacturing costs can be achieved.

A method for manufacturing a component can be provided that includes the steps of preparing a base component and the decorative film of the first or second embodiment; and forming a component constituted by the decorative film being adhered to a surface of the base component by applying the decorative film to a surface of a base component using a three-dimensionally curved surface covering-molding method. By using these methods for manufacturing a component, a component can be provided that has an appearance that exhibits visual effects such as stereoscopic effect and flip-flop properties whereby a pattern can be made visible and invisible depending on the viewing angle.

For the purpose of illustrating typical embodiments of the present invention, typical embodiments of the present invention are described in detail below, referring to the drawings, but the present invention is not limited to these embodiments. Regarding the reference numerals in the drawings, constituents labeled with similar numbers across different drawings are similar or corresponding constituents.

In the present disclosure, the term "film" encompasses articles referred to as "sheets".

Figure 4:
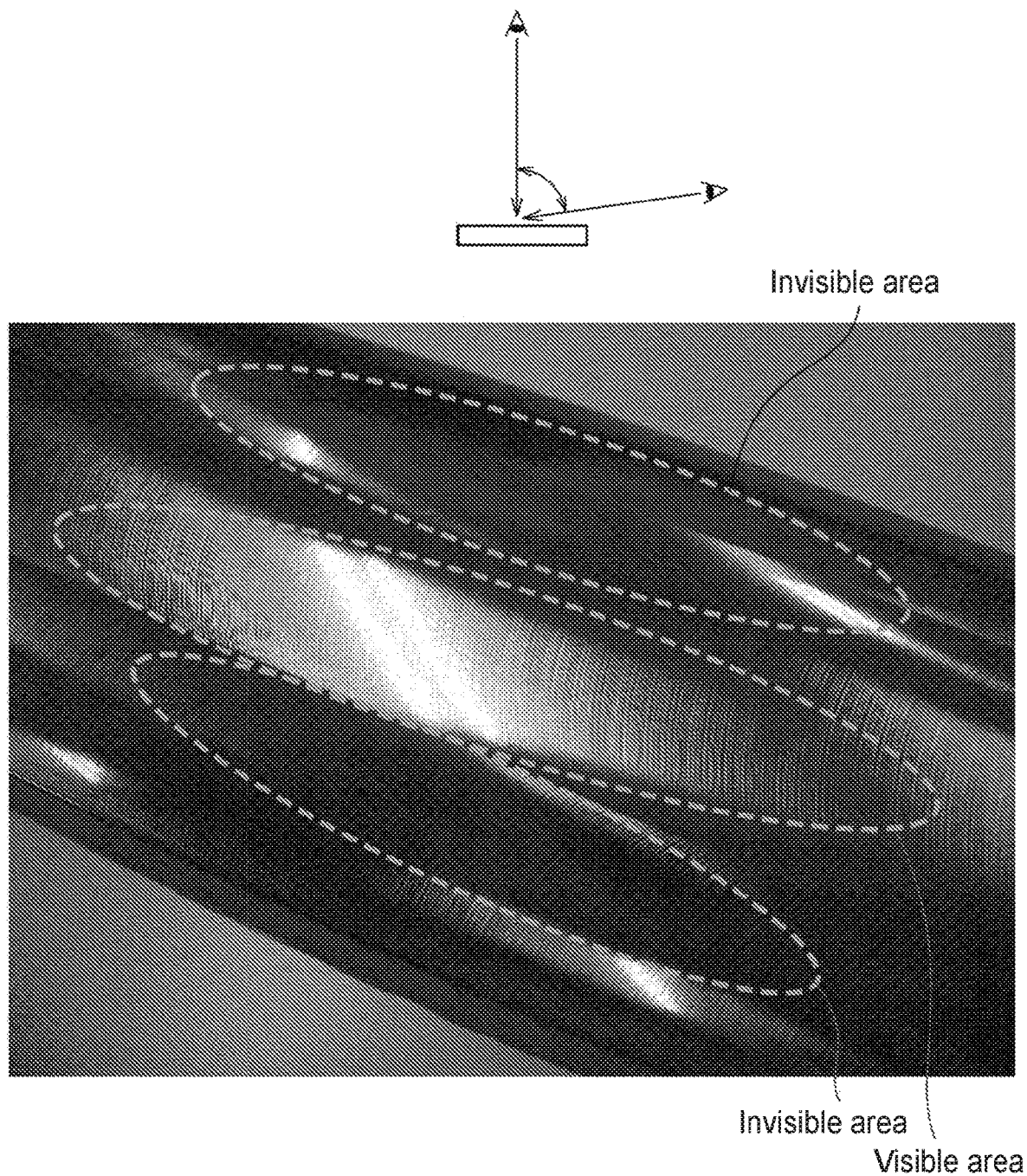
FIG. 4 is an appearance photograph illustrating flip-flop properties of an article to which the decorative film according to an embodiment of the present disclosure is applied; and is a schematic drawing illustrating viewing angles of the article.
Figure 5D:
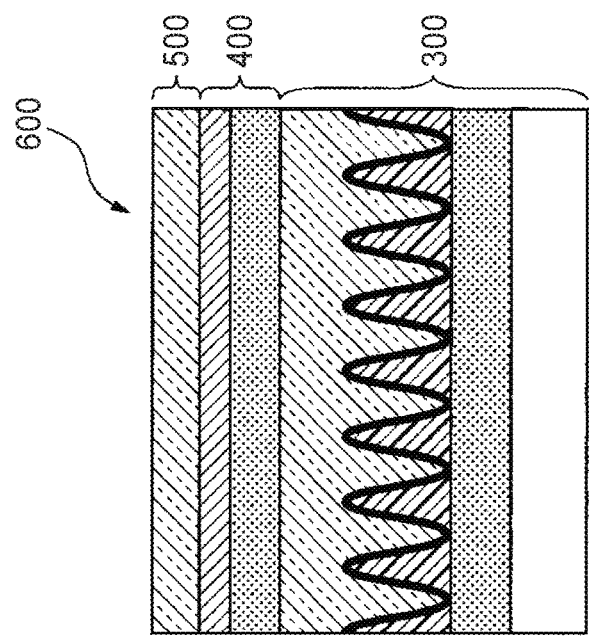
FIGS. 5A to 5D are cross-sectional views illustrating a fabrication procedure of the decorative film according to an embodiment of the present disclosure.
Figure 5A:
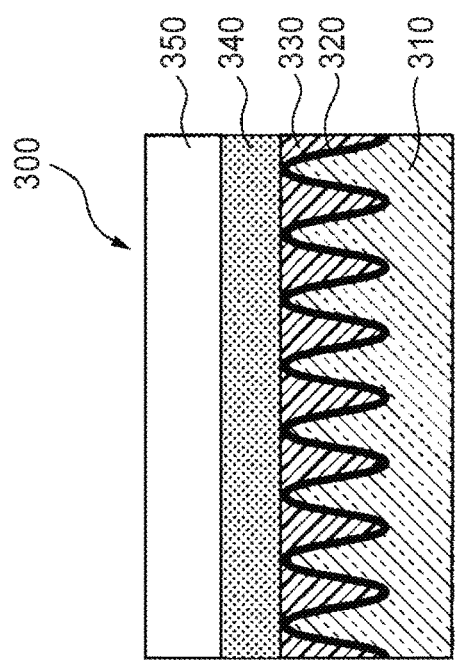
Figure 5B:
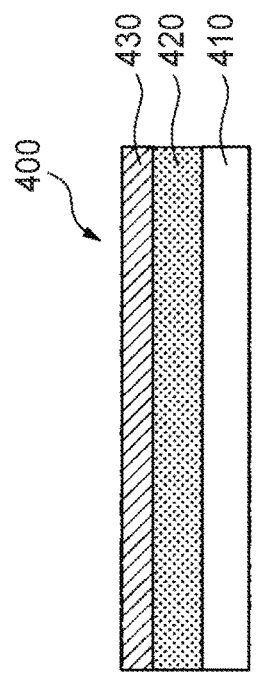
Figure 5C:

In the present disclosure, the term "flip-flop properties" refers to appearance performance by which a pattern appears and disappears due to a concavo-convex shape within the decorative film. FIG. 4 illustrates an example of an article provided with a decorative film that exhibits stereoscopic effect and flip-flop properties. For example, in FIG. 4, complex design patterns including a lot of stripes can be appeared in a visible area around a center of the article, however, stripe patterns and other designs are disappeared in an invisible area adjust to the visible area.

In the present disclosure, the term "storage modulus" is the shear storage modulus G' when viscoelasticity measurement is performed in stretching mode at a frequency of 10 Hz using a dynamic viscoelastic analyzer.

In the present disclosure, the term "transparent" means that an average transmittance in the visible light region is about 80% or greater, and preferably about 90% or greater.

In the present disclosure, the term "semi-transparent" means that an average transmittance in the visible light region is less than about 80%, and preferably about 75% or less, and that the underlying layer is not completely hidden.

In the present disclosure, the term "substantially flat surface shape" refers to a surface state in which convexities and concavities are not visually obvious, for example, a surface state having at least smoothness such that metallic reflection can occur at the surface of the semi-transparent metallic layer.

In the present disclosure, the term "(meth)acrylic" means "acrylic or methacrylic", and the term "(meth)acrylate" means "acrylate or methacrylate".

In the present disclosure, the term, "three-dimensional overlay method" (TOM) refers to a molding method including a process of preparing a film and a three-dimensional article; a process of disposing the film and the article in a vacuum chamber having a heating device on the interior, wherein the film separates the interior space of the vacuum chamber into two and the article is disposed in one of the separated interior spaces; a process of heating the film by the heating device; a process of putting both the interior space in which the article is disposed and the interior space on the opposite side thereof in a vacuum atmosphere; and a process of contacting the article with the film to cover the article with the film while putting the interior space in which the article is disposed in a vacuum atmosphere and putting the interior space on the opposite side thereof in a pressurized atmosphere or normal-pressure atmosphere.

FIG. 1 illustrates a cross-sectional view of a decorative film 100 having stereoscopic effect and flip-flop properties, according to the first embodiment of the present disclosure. The decorative film 100 includes a semi-transparent metallic layer 120, a bonding layer 130, a transparent resin layer 140, a brightening layer 150 having a concavo-convex surface, and a base layer 160. The decorative film 100 may further include, as optional constituents, additional layers such as a design layer, a bonding layer for bonding the layers forming the decorative film together, a primer layer, a release liner, an adhesive layer for attaching the decorative film to a base article, a protective layer for protecting the surface, and the like. In FIG. 1, a protective layer 110, the bonding layer 130, an adhesive layer 170, and a release liner 180 are illustrated as optional constituents. Arrows 10 within the decorative film 100 indicates incident visible light rays.

In FIG. 1, the brightening layer 150 is adjacent to the base layer 160 and the transparent resin layer 140. In the present disclosure, the term "adjacent" when used to describe layers refers to a relationship in which one layer is on or above another layer. For example, in addition to cases where the brightening layer is in direct contact with the base layer and/or the transparent resin layer, cases are also included in which another layer such as a primer layer, a thin bonding layer, or the like, and surface treatments such as corona treatment, plasma treatment, flame treatment, or the like is interposed between the brightening layer and the base layer and/or the transparent resin layer. In cases where the brightening layer and the base layer and/or the transparent resin layer are not in direct contact, a farthest distance between these layers is typically about 10 μm or less, about 5 μm or less, or about 1 μm or less.

A variety of resins, for example, (meth)acrylic resins that include polymethyl methacrylate (PMMA), polyurethane (PU), polyvinyl chloride (PVC), polycarbonate (PC), acrylonitrile/butadiene/styrene copolymer (ABS), polyolefins such as polyethylene (PE) and polypropylene (PP), polyesters such as polyethylene terephthalate (PET) and polyethylene naphthalate (PEN), and copolymers such as ethylene/acrylic acid copolymer, ethylene/ethyl acrylate copolymer, and ethylene/vinyl acetate copolymer, or mixtures thereof can be used as the base layer. From the perspectives of strength, impact resistance, and the like, polyurethane, polyvinyl chloride, polyethylene terephthalate, acrylonitrile/butadiene/styrene copolymer and polycarbonate can be advantageously used as the base layer. The base layer is a layer that serves as a foundation for attaching the decorative film to an adherend. The base layer provides uniform elongation during molding, and/or can also function as a protective layer to more effectively protect the structure from external punctures, impacts, and the like. The base layer may have adhesive properties. The base layer having adhesive properties can be formed from the same material as an adhesive layer (described later). In this embodiment, the decorative film includes an adhesive layer and a release liner in a lower portion of the base layer. The adhesive layer and/or primer layer if there is may be subjected to surface treatment such as corona treatment, plasma treatment, flame treatment, or the like. The base layer can include a brightening material (described later) and may be configured as a base layer with brightening properties (hereinafter referred to as "brightening base layer") that also includes the capabilities of the brightening layer. In this case, the brightening layer may be omitted.

The base layer may have a variety of thicknesses, but from the perspective of optionally preventing defects such as deformation, loss, damage or the like of the concavo-convex shape without adversely affecting the moldability of the decorative film, the thickness is generally not less than approximately 10 μm, not less than approximately 20 μm, or not less than approximately 50 μm and not greater than approximately 500 μm, not greater than approximately 200 μm, or not greater than approximately 100 μm. The thickness of the base layer in cases where the base layer is not flat refers to the thickness of the thinnest portion of the base layer.

In some embodiments, the storage modulus of the base layer may be approximately $1 \times 10^6$ Pa or greater, approximately $1.5 \times 10^6$ Pa or greater, or approximately $2.0 \times 10^6$ Pa or greater and approximately $1.5 \times 10^8$ Pa or less or approximately $1.3 \times 10^8$ Pa or less in a temperature range of 110° C. to 150° C. when measured under conditions of a frequency of 10 Hz and stretching. The storage modulus of the base layer within the range described above can prevent damage to the brightening layer or the brightening base layer and maintain the concavo-convex surface, when stress, heat, or the like is applied to the decorative film or when the decorative film deforms. As a result, even in cases where there is stress, heat, or deformation, the decorative film can exhibit visual effects (stereoscopic effect, flip-flop properties, and the like) that change depending on the viewing angle.

The base layer may be a single layer or may have a multi-layer structure. In cases where the base layer has a multi-layer structure, the storage modulus of the base layer is a single value measured for the entire multi-layer structure, which is a combination of the storage moduli of each individual layer.

A variety of resins, for example, acrylic resins that include polymethyl methacrylate (PMMA), polyurethane (PU), polyvinyl chloride (PVC), polycarbonate (PC), acrylonitrile/butadiene/styrene copolymer (ABS), polyolefins such as polyethylene (PE) and polypropylene (PP), polyesters such as polyethylene terephthalate (PET) and polyethylene naphthalate, and copolymers such as ethylene/acrylic acid copolymer, ethylene/ethyl acrylate copolymer, and ethylene/vinyl acetate copolymer can be used as the transparent resin layer. From the perspectives of transparency, strength, impact resistance, and the like, (meth)acrylic resin, polyurethane, polyvinyl chloride, polyethylene terephthalate, acrylonitrile/butadiene/styrene copolymer and polycarbonate can be advantageously used as the transparent resin layer. The transparent resin layer can function as a protective layer that protects the concavo-convex surface of the brightening layer or the brightening base layer from external punctures, impacts, and the like. The transparent resin layer may have adhesive properties. In some embodiments, the semi-transparent metallic layer, the design layer, and the like can be directly laminated on the transparent resin layer, without interposing a bonding layer. The transparent resin layer having adhesive properties can be formed from the same material as a bonding layer (described later).

The thickness of the transparent resin layer is not limited, but as increased thickness leads to an appearance with stereoscopic effect and a sense of depth derived from the concavo-convex surface of the brightening base layer, the thickness is preferably approximately 10 μm or greater, more preferably approximately 40 μm or greater, and may be approximately 50 μm or greater. However, if the transparent resin layer is too thick, the flip-flop properties will be difficult to detect by the human eye and, therefore, the thickness is preferably set to approximately 300 μm or less, approximately 200 μm or less, or approximately 100 μm or less. If the thickness of the transparent resin layer is set within these ranges, an appearance with stereoscopic effect and flip-flop properties can be exhibited without adversely affecting the moldability of the decorative film. The "thickness of the transparent resin layer" is a thickness of the thinnest portion of the transparent resin layer, that is, a thickness ($t_2$) from a convex apex of the concavo-convex surface to a bottom surface of the semi-transparent metallic layer. The thickness of the transparent resin layer is a factor in determining a distance between the semi-transparent metallic layer and the brightening layer or the brightening base layer that has a concavo-convex shape. In FIG. 1, visible light rays 10 that reflect (scatter) at the concavo-convex surface of the brightening layer 150 and transmit through the semi-transparent metallic layer 120 cause the concavo-convex surface to be visually recognized as a pattern. The reflected and/or scattered visible light 10 enters the semi-transparent metallic layer 120 on the bonding layer (transparent resin layer) 130 side, but due to the thickness ($t_2$) of the transparent resin layer, the angle of incidence of the reflected and/or scattered visible light 10 to the semi-transparent metallic layer 120 (angle between a line perpendicular to the semi-transparent metallic layer and the incident light) fluctuates. While visible light rays that have a small angle of incidence can transmit through the semi-transparent metallic layer, visible light rays that have a large angle of incidence reflect inside the semi-transparent metallic layer without transmitting and reflect again at a different concavo-convex surface. As a result, the visibility of the concavo-convex pattern fluctuates. Accordingly, different from cases where the brightening layer is flat, in a decorative film including a brightening layer or a brightening base layer having a concavo-convex shape, the thickness ($t_2$) of the transparent resin layer is preferably within the range described above in order to express both appearance performances of stereoscopic effect and flip-flop properties, particularly complex flip-flop properties that have expansion, depth, fluctuation, and the like.

Figure 2:
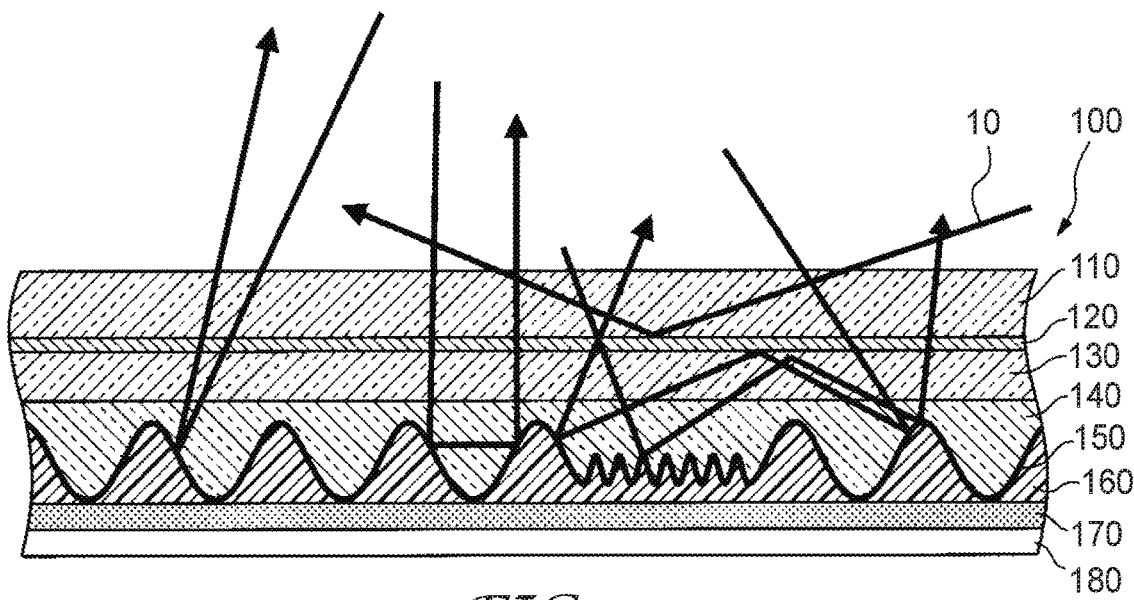
FIG. 2 is a cross-sectional view of a decorative film illustrating another aspect of the decorative film of the present disclosure.

Note that with the concavo-convex shape of the brightening layer or the brightening base layer, the shape thereof, that is, the frequency, depth, width, and the like of the convexities and concavities varies in accordance with the pattern of the design to be formed in the decorative film. Accordingly, as illustrated in FIG. 2, the reflection path of the light 10 reflects the concavo-convex shape.

In some embodiments, the storage modulus of the transparent resin layer may be approximately $1 \times 10^6$ Pa or greater, approximately $1.5 \times 10^6$ Pa or greater, or approximately $2.0 \times 10^6$ Pa or greater and approximately $1.5 \times 10^8$ Pa or less or approximately $1.3 \times 10^8$ Pa or less in a temperature range of 110° C. to 150° C. when measured under conditions of a frequency of 10 Hz and stretching mode. Due to the storage modulus of the transparent resin layer being within the range described above, when stress, heat, or the like is applied to the decorative film or when the decorative film deforms, damage to the brightening layer or the brightening base layer can be prevented and the concavo-convex surface can be maintained. As a result, even in cases where there is stress, heat, or deformation, the decorative film can exhibit visual effects (stereoscopic effect, flip-flop properties, and the like) that change depending on the viewing angle.

The transparent resin layer may be a single layer or may have a multi-layer structure. In cases where the transparent resin layer has a multi-layer structure, the storage modulus of the transparent resin layer is a single value measured for the entire multi-layer structure, which is a combination of the storage moduli of each individual layer. The transparent resin layer may have a multi-layer structure and may have adhesive properties. Therefore, if the bonding layer 130 in FIG. 1 has transparency, the bonding layer 130 may become a transparent resin layer (another transparent resin layer). As discussed later, the bonding layer 130 can be called a first transparent resin layer and the transparent resin layer 140 can be called a second transparent resin layer.

In some embodiments, the storage modulus of the base layer and the transparent resin layer may be approximately $1 \times 10^6$ Pa or greater, approximately $1.5 \times 10^6$ Pa or greater, or approximately $2.0 \times 10^6$ Pa or greater and approximately $1.5 \times 10^8$ Pa or less or approximately $1.3 \times 10^8$ Pa or less in a temperature range of 110° C. to 150° C. when measured under conditions of a frequency of 10 Hz and stretching mode. A sandwich structure is formed in which the concavo-convex shape portion is supported on both sides by the base layer and the transparent resin layer that have the storage moduli described above. As such, when greatly deforming the decorative film during, for example, IM, or a vacuum forming method such as TOM, even when the decorative film is stretched to an area stretching ratio of 100% or higher or 200% or higher, damage to the concavo-convex portion (the brightening layer and the brightening base layer) can be prevented and the concavo-convex surface can be maintained. As a result, even in cases where there is stress, heat, or deformation, the decorative film can exhibit visual effects (stereoscopic effect, flip-flop properties, and the like) that change depending on the viewing angle.

The brightening layer may also be a metal thin film containing a metal selected from aluminum, nickel, gold, platinum, chromium, iron, copper, tin, indium, silver, titanium, lead, zinc, or germanium, or alloys or compounds of the same, that is formed by vacuum deposition, sputtering, ion plating, plating, or the like on a layer that constitutes the decorative film such as the transparent resin layer or the base layer. Such a metal thin film has high luster and, therefore, can provide particularly excellent visual effects.

The brightening layer may be a brightening resin layer in which pigments such as aluminum brightening material, such as aluminum flakes, vapor-deposited aluminum flakes, metal oxide-coated aluminum flakes, or colored aluminum flakes, or pearl brightening material, such as flake or synthetic mica covered with a metal oxide such as titanium oxide, or iron oxide, are dispersed in a binder resin such as acrylic resin, or polyurethane resin. The brightening layer may use a metal foil of aluminum, nickel, gold, silver, copper, or the like. The brightening material described above can be compounded with the resin constituting the base in order to form a brightening base. The brightening material may be compounded at a variety of amounts, but, in consideration of brightness, opacity and the like, can be compounded at an amount of approximately 0.1 mass % or greater or approximately 0.3 mass % or greater and approximately 12 mass % or less or approximately 5 mass % or less in the brightening base.

The concavo-convex surface of the brightening layer can be formed, for example, by depositing the metal thin film on the transparent resin layer or the base layer that has the concavo-convex surface, or by applying and drying or curing a brightening resin layer composition on the transparent resin layer or the base layer that has the concavo-convex surface. The concavo-convex surface of the brightening base layer can be formed, for example, by applying a concavo-convex shape to the base itself that includes the brightening material, or by applying and drying or curing a brightening base layer composition on the transparent resin layer that has a concavo-convex surface.

In an embodiment, as illustrated in FIG. 5, with a laminate (inner relief core section) that serves as a portion of the decorative film, a transparent resin layer 310 that has a concavo-convex surface is formed by applying the transparent resin layer 310 on a release liner (not illustrated) and applying a die that has an emboss pattern to the transparent resin layer 310 while heating as necessary. A brightening layer 320 is formed by depositing the metal thin film on this concavo-convex surface by vapor deposition, or by applying and drying or curing a brightening resin layer composition on this concavo-convex surface. Then, the laminate (concavo-convex decorative section) that serves as a portion of the decorative film is formed by covering the concavo-convex surface of the brightening layer 320 with the base layer such that the convex portions of the concavo-convex surface are filled. Alternately, a laminate (concavo-convex decorative section) that does not include a brightening layer 350 and that serves as a portion of the decorative film is formed by applying and drying or curing a brightening base layer composition so as to fill the convex portions of the concavo-convex surface of the transparent resin layer 310. The surface of the transparent resin layer to which the release liner is applied has excellent smoothness and, therefore, the smoothness of the semi-transparent metallic layer that is applied on the transparent resin layer is simultaneously enhanced. Accordingly, flip-flop properties of a decorative film formed using this laminate will be enhanced.

In another embodiment, a base layer that has a concavo-convex surface is formed by pressing a die having an emboss pattern onto the base layer 330 while heating as necessary, and the brightening layer is formed by depositing a metal thin film thereon, or by applying and drying or curing a brightening resin layer composition thereon. Here, the base layer to which the emboss pattern has been heat-transferred may be a multi-layer structure formed from two or more layers. In this case, the layer on the side contiguous with the emboss pattern preferably has lower rigidity than the other layers. According to this configuration, the strain generated by the pressing of the emboss pattern can be absorbed or mitigated by the layer with low rigidity, and impact on the other layers can be suppressed. Additionally, changes over time of the emboss shape due to residual strain can be prevented.

A laminate (concavo-convex decorative section) that serves as a portion of the decorative film is formed by covering the concavo-convex surface of the brightening layer 320 with the transparent resin layer 310 such that the convex portions of the concavo-convex surface are filled. Alternatively, a brightening base layer that has a concavo-convex surface is formed by pressing a die having an emboss pattern onto the brightening base layer while heating as necessary. A laminate (concavo-convex decorative section) that serves as a portion of the decorative film is formed by covering the concavo-convex surface of the brightening base layer with the transparent resin layer such that the convex portions of the concavo-convex surface are filled. Rigidity of the transparent resin layer is preferably higher than that of the base layer. Because residual strain will be small and rigidity will be high on the side where the concavo-convex shape of the brightening base layer is filled by the transparent resin layer, the concavo-convex shape can be more stably maintained.

In another embodiment, a second transparent resin layer is formed by thinly applying and drying or curing a transparent resin layer composition on a surface of a die or sheet that has a concavo-convex surface and, as necessary, has been subjected to release treatment, and the brightening layer is formed by depositing a metal thin film thereon, or by applying and drying or curing a brightening resin layer composition thereon. Thereafter, the laminate of the second transparent resin layer and the brightening layer is removed from the sheet or die, the concavo-convex surface of the second transparent resin layer on the side opposite the brightening layer is covered with the first transparent resin layer, the design layer, or the protective layer such that the concave portions of the concavo-convex surface are filled, and the concavo-convex surface of the brightening layer side is covered with the base layer. Thus, a laminate that serves as a portion of the decorative film is formed. Additionally, a transparent resin layer that has a concavo-convex surface is formed by filling and drying or curing a transparent resin layer composition such as to cover the convex portions of the die or sheet that has a concavo-convex surface and that, as necessary, has been subjected to release treatment. A laminate (concavo-convex decorative section) that serves as a portion of the decorative film is formed by covering the concavo-convex surface of this transparent resin layer with the brightening base layer.

Additionally, an adhesive layer and a release liner can be applied onto the base layer or the brightening layer of the laminate (concavo-convex decorative section) mentioned above.

In cases where the binder of the brightening resin layer is thermoplastic, or in cases where the brightening layer includes metal foil, a concavo-convex surface can be imparted to the brightening layer by pressing a die having an emboss pattern onto the brightening layer while heating as necessary.

The pattern or design of the concavo-convex surface of the brightening layer or the brightening base layer may be regular or irregular, and is not particularly limited, but examples include parallel lines, wood grain, grainy, pebbled, cloth grain, pearskin, leather dyed pattern, matte, hairlines, spins, characters, symbols, geometric forms, and the like. If the concavo-convex shape is formed by grooves, the width of the grooves is generally not less than approximately 1 μm or not less than approximately 10 μm, and not greater than approximately 1 mm or not greater than approximately 100 μm. By setting the width of the grooves of the concavo-convex shape to be within the range described above, visual effects (stereoscopic effect, flip-flop properties, and the like) that change depending on the viewing angle that are exhibited by the decorative film can be further enhanced.

In FIG. 1, $t_1$ is a depth of the concavo-convex surface of the brightening layer and is defined as a difference in height from a convex portion apex to a bottom portion of a contiguous concave portion. The depth of the concavo-convex surface of the brightening layer may be uniform throughout an entirety of the concavo-convex surface, or may consist of a variety of values. The depth of the concavo-convex surface of the brightening layer is generally not less than approximately 1 μm, not less than approximately 5 μm, not less than approximately 10 μm and not greater than approximately 100 μm, or approximately 50 μm or within a lower range. The depth ($t_1$) of the concavo-convex surface can also be applied to the brightening base layer. The depth of the concavo-convex shape contributes to the reflection and/or scattering of incident visible light rays. For example, in cases where the depth of the concavo-convex shape is shallow, the incident visible light rays reflect at the concavo-convex surface and enter as-is into the semi-transparent metallic layer. On the other hand, in cases where the depth of the concavo-convex shape is deep, there are cases in which intensity variations occur in the reflected light such as the visible light rays that have reflected at the concavo-convex surface entering an adjacent concavo-convex surface and reflecting at the surface thereof. As a result, the visibility of the concavo-convex shape pattern can fluctuate. Accordingly, different from cases where the brightening layer is flat, in a decorative film including a brightening layer or a brightening base layer having a concavo-convex shape, the depth of the concavo-convex surface is preferably within the range described above in order to express both appearance performances of stereoscopic effect and flip-flop properties, particularly complex flip-flop properties that have expansion, depth, fluctuation, and the like.

The thickness of the brightening layer may be, for example, not less than approximately 10 nm. not less than approximately 20 nm, or not less than approximately 50 nm. By setting the thickness of the brightening layer to be not less than 10 nm, a decorative film can be obtained that is capable of hiding the surface of the base article (surface of the underlying layer) and reflection exhibiting visual effects (stereoscopic effect, flip-flop properties, and the like) that change depending on the viewing angle. The thickness of the brightening layer may be not greater than approximately 100 µm, not greater than approximately 50 µm, or not greater than approximately 20 µm.

In cases where the brightening layer is a metal thin film formed by vacuum deposition, sputtering, or the like, the thickness of the brightening layer can be set to not less than approximately 10 nm or not less than approximately 20 nm, and not greater than approximately 100 nm or not greater than approximately 80 nm. A decorative film including such an extremely thin brightening layer can be particularly advantageously used in a molding method that is accompanied by large deformations of the decorative film such as stretching to an area stretching ratio of approximately 100% or higher, as in TOM or the like.

In some embodiments, the thickness of one or both of the base layer or the brightening base layer and the transparent resin layer having the storage modulus of approximately $1 \times 10^6$ Pa to approximately $1.5 \times 10^8$ Pa in a temperature range of 110° C. to 150° C. when measured under conditions of a frequency of 10 Hz and stretching mode, may be approximately 1.0 times or greater, approximately 1.2 times or greater, or approximately 1.5 times or greater and approximately 3.0 times or less, approximately 2.5 times or less, or approximately 2.0 times or less the depth of the concavo-convex surface.

As illustrated in FIG. 1, the decorative film 100 includes the semi-transparent metallic layer 120 on the transparent resin layer 140 or the bonding layer 130. The semi-transparent metallic layer 120 is a layer capable of reflecting or transmitting the visible light rays 10 depending on the angle of incidence.

The semi-transparent metallic layer may be a metal thin film containing a metal selected from aluminum, nickel, gold, platinum, chromium, iron, copper, tin, indium, silver, titanium, lead, zinc, germanium, or the like, or alloys or compounds of the same, formed by vacuum deposition, sputtering, ion plating, plating or the like.

The semi-transparent metallic layer may be a brightening (metallic) resin layer in which brightening (metallic) pigments such as aluminum brightening material, such as aluminum flakes, vapor-deposited aluminum flakes, metal oxide-coated aluminum flakes, or colored aluminum flakes, or pearl brightening material, such as flake or synthetic mica covered with a metal oxide such as titanium oxide, or iron oxide, are dispersed in a binder resin such as acrylic resin, or polyurethane resin. The semi-transparent metallic layer may use a metal foil of aluminum, nickel, gold, silver, copper, or the like.

The semi-transparent metallic layer may have a variety of visible light transmissions depending on the brightness (reflectivity) and the like of the brightening layer or the brightening base layer. However, in cases where the brightness of the brightening layer is high such as when constituted by a metal vapor deposited layer, a metal foil or the like, the visible light transmission of the semi-transparent metallic layer is, for example, not less than approximately 10%, not less than approximately 15%, or not less than approximately 17% and not greater than approximately 70%, not greater than approximately 50%, not greater than approximately 40%, or not greater than approximately 30%, and in cases where the brightness (reflectivity) of the brightening layer is low compared to a metal vapor deposited layer such as when constituted by the brightening layer or the brightening base layer including the brightening material, the visible light transmission of the semi-transparent metallic layer is, for example not less than approximately 15%, not less than approximately 20%, not less than approximately 25%, or not less than approximately 30% and not greater than approximately 75%, not greater than approximately 70%, or not greater than approximately 65%. In cases where the protective layer and/or the bonding layer adjacent to the semi-transparent metallic layer are included, the term "visible light transmission" means the visible light transmission of a configuration including these layers. By setting the visible light transmission of the semi-transparent metallic layer to be within the range described above, visual effects (flip-flop properties, luxurious feel, and the like) that change depending on the viewing angle that are exhibited by the decorative film can be further enhanced.

Provided that the decorative film exhibits the desired visual effects (flip-flop properties, stereoscopic effect, luxurious feel, and the like), the semi-transparent metallic layer may have a variety of thicknesses, but, in consideration of the visible light transmission described above and the visual effects (flip-flop properties, stereoscopic effect, luxurious feel, and the like), the thickness of the semi-transparent metallic layer can be set to, for example, not less than approximately 0.1 nm, not less than approximately 1 nm, or not less than approximately 2 nm and not greater than approximately 100 nm, not greater than approximately 50 nm, or not greater than approximately 40 nm. Note that, typically, these films form an island-sea structure and do not form a continuous laminar structure, and the film thickness as described herein is a measure of the thickness at the island portions. By setting the thickness of the semi-transparent metallic layer to be within the range described above, the balance between the reflectivity and the transparency of incident visible light will be excellent and, therefore, a decorative film can be obtained that is capable of exhibiting visual effects (luxurious feel, stereoscopic effect, flip-flop properties, and the like) that change depending on the viewing angle.

In cases where the semi-transparent metallic layer is a metal thin film formed by vacuum deposition, sputtering, or the like, in consideration of the visible light transmission described above and the visual effects (flip-flop properties, stereoscopic effect, luxurious feel, and the like), the thickness of the semi-transparent metallic layer can be set to, for example, not less than approximately 0.1 nm, not less than approximately 1 nm or not less than approximately 2 nm, and not greater than approximately 100 nm, not greater than approximately 50 or not greater than approximately 40 nm. A decorative film including such an extremely thin semi-transparent metallic layer can be particularly advantageously used in a molding method that is accompanied by large deformations of the decorative film such as stretching to an area stretching ratio of approximately 100% or higher, as in TOM or the like.

The decorative film of the present disclosure may include a protective layer. As the protective layer, a variety of resins, for example, (meth)acrylic resins such as polymethyl methacrylate (PMMA) and (meth)acrylic copolymer, polyurethane, fluorine resins such as ethylene/tetrafluoroethylene copolymer (ETFE), polyvinylidene fluoride (PVDF), and methyl methacrylate/vinylidene fluoride copolymer (PMMA/PVDF), silicone copolymer, polyvinyl chloride (PVC), polycarbonate (PC), polyolefins such as polyethylene (PE) and polypropylene (PP), polyesters such as polyethylene terephthalate (PET) and polyethylene naphthalate (PEN), and copolymers such as ethylene/acrylic acid copolymer (EAA) and ionomers thereof, ethylene/ethyl acrylate copolymer, ethylene/vinyl acetate copolymer, and the like, or mixtures thereof can be used. Due to their excellent weather resistance, (meth)acrylic resins, polyurethanes, fluorine resins, and polyvinyl chlorides are preferred, and due to their excellent scratch resistance and minimal environmental impact when incinerated or buried as waste, (meth)acrylic resins and polyurethanes are more preferred. The protective layer may also have a multi-layer structure. For example, the protective layer may be a laminate of films formed from the above resins, or it may by a multi-layer coating of the above resins. In cases where the material of the semi-transparent metallic layer is a metal-based material, fluctuation of the visible light transmission caused by oxidation degradation of the semi-transparent metallic layer can be prevented by disposing the protective layer. Oxidation degradation of the semi-transparent metallic layer can be further prevented by using a protective layer including a barrier layer of a silicon oxide or the like.

The protective layer can be formed by coating a resin composition directly or via a bonding layer on the semi-transparent metallic layer. The coating of the protective layer can be performed before application or after application of the decorative film to an article. Alternatively, the protective layer film can be formed by coating the resin composition on a separate liner, and that film can be laminated on the semi-transparent metallic layer via a bonding layer. In cases where the semi-transparent metallic layer is adhesive to the protective layer film formed on the liner, the protective layer film can be laminated directly to the semi-transparent metallic layer without having a bonding layer interposed therebetween.

A protective layer formed into a film beforehand through extrusion, drawing, or the like may be used. This type of film can be laminated on the semi-transparent metallic layer via a bonding layer. Alternatively, in cases where the semi-transparent metallic layer is adhesive to this type of film, the film can be laminated directly to the semi-transparent metallic layer without having a bonding layer interposed therebetween. By using a film with high flatness, a structure can be given an appearance of higher surface flatness. Furthermore, the protective layer can be formed by multi-layer extrusion with other layers. A (meth)acrylic film can be used as the other layer. A resin containing polymethyl methacrylate (PMMA), butyl polyacrylate, (meth)acrylic copolymer, ethylene/acrylic copolymer, ethylene vinyl acetate/acrylic copolymer resin, and the like can be formed into a film and used as the (meth)acrylic film. The (meth)acrylic film has excellent transparency, is resistant to heat and light, and will not easily cause discoloration or luster change when used outdoors. Also, the (meth)acrylic film is further characterized by excellent contamination resistance without the use of a plasticizer and the ability to be processed by deep drawing due to excellent moldability. It is particularly preferable to make PMMA the main component. The protective layer may have a three-dimensional shape such as an emboss pattern on a surface thereof.

The protective layer may have a variety of thicknesses, but it is generally not less than approximately 1 µm, not less than approximately 5 µm, or not less than approximately 10 µm and not greater than approximately 200 µm, not greater than approximately 100 µm, or not greater than approximately 80 µm. When the decorative film is applied to an article with a complex shape, in terms of shape following characteristics, a thin protective layer is advantageous; for example, a thickness of not greater than approximately 100 µm or not greater than approximately 80 µm is preferable.

On the other hand, a thick protective layer is more advantageous in terms of giving the structure high light resistance and/or weather resistance; for example, a thickness of not less than approximately 5 µm or not less than approximately 10 µm is preferable.

The protective layer may include, as necessary, ultraviolet absorbers such as benzotriazole, Tinuvin (trademark) 400 (manufactured by BASF), and the like, and hindered amine light stabilizers (HALS) such as Tinuvin (trademark) 292 (manufactured by BASF), and the like. Through the use of ultraviolet absorbers, hindered amine light stabilizers, and the like, discoloration, fading, deterioration and the like of coloring material (in particular organic pigments that are relatively sensitive to light such as ultraviolet light, and the like) included in the design layer and the like can be effectively prevented. The protective layer may include a hard coating material, a luster-imparting agent, and the like, and may also have an additional hard coating layer. The protective layer is generally transparent but in order to provide an intended appearance, all or a portion of the outermost layer may be semi-transparent, and a portion of the protective layer may be opaque.

In some embodiments, the storage modulus of the protective layer may be approximately $1 \times 10^6$ Pa or greater, approximately $1.5 \times 10^6$ Pa or greater, or approximately $2.0 \times 10^6$ Pa or greater and approximately $1.5 \times 10^8$ Pa or less or approximately $1.3 \times 10^8$ Pa or less in a temperature range of 110° C. to 150° C. when measured under conditions of a frequency of 10 Hz and stretching mode. In cases where the protective layer has a multi-layer structure, the storage modulus of the protective layer is a single value measured for the entire multi-layer structure, which is a combination of the storage moduli of each individual layer. Due to the storage modulus of the protective layer being within the range described above, when stress, heat, or the like is applied to the decorative film or when the decorative film deforms, damage to the semi-transparent metallic layer and/or the brightening layer or the brightening base layer can be prevented. As a result, even in cases where there is stress, heat, or deformation, the decorative film can exhibit visual effects (stereoscopic effect, flip-flop properties, and the like) that change depending on the viewing angle.

In some embodiments, the storage modulus of the protective layer and the transparent resin layer may be approximately $1 \times 10^6$ Pa or greater, approximately $1.5 \times 10^6$ Pa or greater, or approximately $2.0 \times 10^6$ Pa or greater and approximately $1.5 \times 10^8$ Pa or less or approximately $1.3 \times 10^8$ Pa or less in a temperature range of 110° C. to 150° C. when measured under conditions of a frequency of 10 Hz and stretching mode. A sandwich structure is formed in which the concavo-convex shape portion is supported on both sides by the protective layer and the transparent resin layer that have the storage moduli described above. As such, when greatly deforming the decorative film during, for example, IM, or vacuum forming methods such as TOM, even when the decorative film is stretched to an area stretching ratio of 100% or higher or 200% or higher, damage to the semi-transparent metallic layer can be prevented. As a result, even in cases where there is stress, heat, or deformation, the decorative film can exhibit visual effects (stereoscopic effect, flip-flop properties, and the like) that change depending on the viewing angle.

Figure 3:
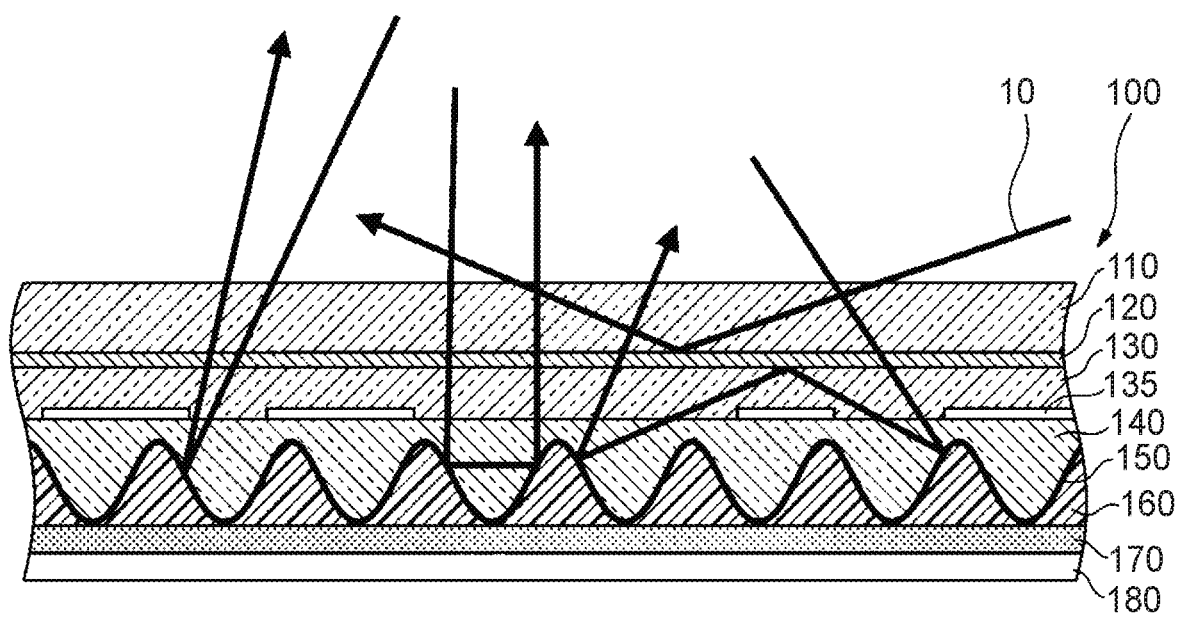
FIG. 3 is a cross-sectional view of a decorative film illustrating another aspect of the decorative film of the present disclosure.

In an embodiment, the decorative film may include a design layer 135 between the protective layer and the semi-transparent metallic layer, or between the semi-transparent metallic layer and the transparent resin layer, for example, as illustrated in FIG. 3, between the first transparent resin layer (bonding layer) 130 and the second transparent resin layer 140.

Examples of the design layer include a color layer that exhibits a paint color or the like, a pattern layer that imparts a logo, an image, or a pattern such as a wood grain pattern, stone grain pattern, geometric pattern or leather pattern to the structure, a relief (embossed pattern) layer in which recesses and protrusions are provided on the surface, and combinations thereof.

Pigments such as inorganic pigments such as titanium oxide, carbon black, chrome yellow, yellow iron oxide, colcothar, or red iron oxide; organic pigments such as phthalocyanine pigments (phthalocyanine blue, phthalocyanine green, or the like), azo lake pigments, indigo pigments, perinone pigments, perylene pigments, quinophthalone pigments, dioxazine pigments, or quinacridone pigments (quinacridone red, or the like) are dispersed in binder resin such as (meth)acrylic resin or polyurethane resin and such dispersions can be used as a color layer.

As a pattern layer, a film, sheet, or the like having a pattern, logo, design, or the like formed by printing such as gravure direct printing, gravure offset printing, inkjet printing, laser printing or screen printing, coating such as gravure coating, roll coating, die coating, bar coating or knife coating, punching, or etching may be used.

As a relief layer, a thermoplastic resin film having a concavo-convex form on the surface obtained by a conventionally known method such as embossing, scratching, laser processing, dry etching, hot pressing, or the like may be used. The relief layer can be formed by coating a heat-curable or radiation-curable resin such as curable (meth) acrylic resin on a release film having a concavo-convex form, curing it by heat or radiation, and removing the release film. The thermoplastic resin, heat-curable resin and radiation-curable resin used in the relief layer are not particularly limited, but may be fluorine-based resin, polyester-based resin such as PET and PEN, (meth)acrylic resin, polyethylene, polypropylene, thermoplastic elastomer, polycarbonate, polyamide, ABS resin, acrylonitrile/styrene resin, polystyrene, vinyl chloride, polyurethane, and the like.

The design layer may have a variety of thicknesses, but the thickness is generally not less than approximately 0.5 µm, not less than approximately 5 µm, or not less than approximately 20 µm and not greater than approximately 300 µm, not greater than approximately 200 µm, or not greater than approximately 100 µm.

The decorative film may also contain an adhesive layer 180 for attaching the decorative film to a base article. Generally used adhesives such as solvent-type, emulsion-type, pressure-sensitive type, heat-sensitive type, and heat-curable or ultraviolet-curable type adhesives, including (meth)acrylics, polyolefins, polyurethanes, polyesters, rubbers, and the like can be used as the adhesive layer. The thickness of the adhesive layer is generally not less than approximately 5 µm, not less than approximately 10 µm, or not less than approximately 20 µm and not greater than approximately 200 µm, not greater than approximately 100 µm, or not greater than approximately 80 µm.

As the release layer for protecting the adhesive layer or the base layer that is adhesive, any suitable release liner 180 can be used. Examples of typical release liners include those prepared from paper (for example, kraft paper), and polymer materials (for example, polyolefins such as polyethylene and polypropylene, and ethylene vinyl acetate, polyurethane and polyesters such as polyethylene terephthalate and the like).

The release liner may be coated as necessary with a layer of release agent such as a silicone-based material or fluorocarbon-based material.

The thickness of the release agent layer is generally not less than approximately 5 µm, not less than approximately 15 µm, or not less than approximately 25 µm and not greater than approximately 300 µm, not greater than approximately 200 µm, or not greater than approximately 150 µm.

Bonding layers and/or primer layers may be used to bond the layers constituting the decorative film. Generally used adhesives such as solvent-type, emulsion-type, pressure-sensitive type, heat-sensitive type, heat-curable or ultraviolet-curable type adhesives, including acrylics, polyolefins, polyurethanes, polyesters, rubbers, and the like can be used as the bonding layers and the primer layers. The thickness of the bonding layers and/or the primer layers is generally not less than approximately 0.05 µm, not less than approximately 0.5 µm, or not less than approximately 5 µm and not greater than approximately 100 µm, not greater than approximately 50 µm, or not greater than approximately 20 µm. In cases where a bonding layer and/or primer layer is formed from transparent resin and is adjacent to the transparent resin layer, a portion of the transparent resin layer may be regarded as the bonding layer and/or the primer layer.

Within a range where the visual effects of the decorative film (stereoscopic effect, flip-flop properties, and the like) are not impaired, the protective layer, the transparent resin layer, the base layer, the adhesive layer, and/or the bonding layer may include a coloring material such as an inorganic pigment or an organic pigment, the same as that described for the design layer.

In a decorative film containing a metal thin film such as a tin vapor deposition film, indium vapor deposition film as the brightening layer, for example a decorative film used as a substitute film for chrome plating or the like, performance of hiding the base article can be improved by incorporating the aforementioned pigments into the base layer, the adhesive layer, and the like. A tin vapor deposition film may have deposition defects such as pinholes in the vapor deposition film surface, but such defects can be made unnoticeable by coloring the base layer, the adhesive layer, and the like.

It is advantageous if the amount of pigment included in the aforementioned layers is not less than approximately 0.1 mass %, not less than approximately 0.2 mass %, or not less than approximately 0.5 mass % and not greater than approximately 50 mass %, not greater than approximately 20 mass %, or not greater than approximately 10 mass % of the aforementioned layers.

The thickness of the decorative film may generally be not less than approximately 25 µm, not less than approximately 50 µm, or not less than approximately 100 µm and not greater than approximately 2 mm, not greater than approximately 1 mm, or not greater than approximately 500 µm. By setting the thickness of the decorative film to be within the range described above, the decorative film can be made to sufficiently conform to an article with a complex shape, and thus a structure with excellent appearance can be provided.

The scratch resistance of the decorative film can be evaluated in terms of pencil hardness in accordance with JIS K5600-5-4. The pencil hardness of the decorative film of a certain embodiment is 6B or greater when measured by fixing the decorative film on a glass plate with the adhesive layer or polyurethane thermal adhesive layer facing the surface of the glass plate, and then scratching the protective layer at a speed of 600 mm/min. The pencil hardness may be not below 5B, not below 4B, or not below 3B.

A method for manufacturing the decorative film is given by way of example while referring to FIGS. 5A to 5D, but the method for manufacturing the decorative film is not limited thereto.

The transparent resin layer 310 including polyurethane or the like is coated on a release liner of a PET film or like. A die having an emboss pattern is applied to the transparent resin layer 310 while heating as necessary and, thus, the transparent resin layer 310 that has a concavo-convex surface is formed. Here, the transparent resin layer 310 to which the emboss pattern has been heat-transferred may be a multi-layer structure formed from two or more layers. In this case, the layer on the side contiguous with the emboss pattern preferably has lower rigidity than the other layers. According to this configuration, strain generated by the pressing of the emboss pattern can be absorbed or mitigated by the low rigidity layer, and impact on the other layers can be suppressed.

Then, a metal thin film is applied to the concavo-convex surface by vapor deposition or the like and, thus, the brightening layer 320 is formed. A laminate (concavo-convex decorative section) is formed by covering the concavo-convex surface of the brightening layer 320 with the base layer 330 that includes polyurethane or the like such that the convex portions of the concavo-convex surface are filled. Here, the laminate (concavo-convex decorative section) that serves as a portion of the decorative film may be formed by covering the concavo-convex surface of the transparent resin layer 310 with the brightening base layer such that the convex portions of the concavo-convex surface are filled, without applying the brightening layer 320. Then, the adhesive layer 340 are coated on a release liner 350 of a PET film for which a surface has been subjected to release treatment and, thus, a laminate (adhesion section) is formed. The base layer 330 of the laminate (concavo-convex decorative section) and the adhesive layer 340 of the laminate (adhesion section) are adhered together by heating and/or pressing as necessary and, thus, a laminate A (300) is formed.

A bonding layer 420 including polyurethane or the like is coated on a release liner 410 of a PET film. A metal thin film is applied on the bonding layer 420 by vapor deposition or the like and, thus, a laminate 400 (semi-transparent section) including a semi-transparent metallic layer 430 is formed. On the other hand, a laminate 500 (protective section) including a protective layer 510 of polyurethane or the like that serves as a portion of the protective layer is prepared. As necessary, a bonding layer is coated on protective layer or semi-transparent metallic layer and the laminate 400 (semi-transparent section) and the laminate 500 (protective section) are laminated. Note that the protective layer 510 can be formed from a plurality of layers via a casting method, a co-extrusion method or the like, and may be a laminate (surface layer section) including a protective layer formed from polymethylmethacrylate (PMMA) or the like and a protective layer formed from polyvinylidene fluoride resin (PVDF) or the like. The laminate 400 (semi-transparent section) and the laminate 500 (protective section) of the laminate (surface layer section) are adhered together by heating and/or pressing as necessary and, thus, a laminate B is formed.

The release liners of each of the laminate A and the laminate B are removed, and the transparent resin layer 340 of the laminate A and the bonding layer 330 of the laminate B are adhered together by heating and/or pressing as necessary. Thus, a decorative film 600 is formed. In the method of manufacturing the decorative film, the coating may include a drying and/or a curing process as necessary, and the co-extrusion method may be replaced with a single layer extrusion method, a multilayer extrusion method, or the like.

According to an embodiment of the present disclosure, an article is provided by covering a base article with the decorative film. For example, an article on which the decorative film is adhered can be formed by applying the decorative film to an article by IM or TOM. In another embodiment, by extruding a thermoplastic material that serves as the base article onto the decorative film, an article in which the decorative film and the extruded thermoplastic material have been integrated can be formed. IM, TOM and extrusion may be performed by conventionally known methods.

The base article may be formed from a variety of materials including, for example, polypropylene, polycarbonate, acrylonitrile-butadiene-styrene copolymer, or mixtures or blends thereof. Moreover, a variety of flat materials and three-dimensional materials can be used.

The maximum area stretching ratio of the decorative film after molding is generally not lower than approximately 50%, not lower than approximately 100%, or not lower than approximately 200% and not higher than approximately 1000%, not higher than approximately 500%, or not higher than approximately 300%. The area stretching ratio is defined as area stretching ratio (%)=(B−A)/A (where A is the area of a certain portion of the decorative film before molding, and B is the area of the portion corresponding to A of the decorative film after molding). For example, if the area of a certain portion of the decorative film is 100 cm$^2$ before molding and the area of that portion of the article after molding is 250 cm$^2$, the area stretching ratio is 150%. The maximum area stretching ratio refers to the value at the location of highest area stretching ratio in the decorative film on the entire article surface. For example, when a flat film is affixed to a three-dimensional article by TOM, the portion of the film that first affixes to the article is stretched very little and has an area stretching ratio of nearly 0%. The ends that are affixed last are stretched significantly and achieve an area stretching ratio of 200% or higher. Thus, the area stretching ratio varies widely depending on location. Whether the molding process is acceptable or not is determined by the presence or absence of defects such as nonconformity to the article, tearing of the film, and the like in the portions of the film that are stretched the most. Accordingly, the area stretching ratio in the portion that was stretched the most, that is, the maximum area stretching ratio rather than the average area stretching ratio of the overall molded product becomes the substantial index for the acceptability of the molded product. The maximum area stretching ratio is determined by, for example, printing 1-mm squares on the entire surface of the decorative film before molding and then measuring the change in the areas thereof after molding, or by measuring the thickness of the decorative film before and after molding.

The decorative film of the present disclosure may be used for the purpose of decoration of automotive parts, household appliances, railroad cars, building materials, and the like, in various molding techniques such as TOM, IM, extrusion, and the like, and it can be used particularly advantageously in TOM.

EXAMPLES

In the following examples, specific embodiments of the present disclosure are given by way of example, but the present invention should not be construed as being restricted thereto. All parts and percentages are by mass unless otherwise indicated.

The reagents, raw materials, and the like used in the examples are shown below in Table 1.

TABLE 1

| Compound name, brand name or abbreviation | Description | Supplier |
|---|---|---|
| Resamine (trademark) D6260 | Aqueous polyurethane resin, 20 mass % solid content | Dainichiseika Color & Chemicals Mfg. Co., Ltd. (Chuo-ku, Tokyo, Japan) |
| Resamine (trademark) D28 | Thickener: Acrylic resin solution, 17.5 mass % solid content | Dainichiseika Color & Chemicals Mfg. Co., Ltd. (Chuo-ku, Tokyo, Japan) |
| Surfynol (trademark) 104E | Defoaming agent: Polyethylene glycol solution | Air Products Japan, Inc. (Kawasaki, Kanagawa, Japan) |
| IPA | Solvent: Isopropyl alcohol | Wako Pure Chemical Industries, Ltd. (Osaka, Japan) |
| MIBK | Methyl isobutyl ketone | Wako Pure Chemical Industries, Ltd. (Chuo-ku, Osaka, Japan) |
| Polyment (trademark) NK-350 | Primer: Aminoethylated acrylic copolymer | Nippon Shokubai Co, Ltd. |
| SK Dyne (trademark) 1506BHE | Adhesive: Acrylic polymer, 33 mass % solid content | Soken Chemical & Engineering Co., Ltd. (Toshima-ku, Tokyo, Japan) |
| Jurymer (trademark) YM-5 | Gelling agent: Acrylic resin solution, 40 mass % solid content | Toagosei Co., Ltd. (Minato-ku, Tokyo, Japan) |
| E-5XM | Crosslinking agent: Epoxy compound solution | Soken Chemical & Engineering Co., Ltd. (Toshima-ku, Tokyo, Japan) |
| EMR-D6390 | Brightening material: Aluminum flakes | Toyo Aluminum K.K. (Chuo-ku, Osaka, Japan) |

Viscoelasticity Characteristics

The viscoelasticity characteristics of the layers constituting the decorative film were determined from the storage modulus G' (Pa) at 110° C. to 150° C. under conditions of stretching mode and a frequency of 10.0 Hz, obtained using a dynamic viscoelastic analyzer (ARES, manufactured by TA Instruments Japan, Shinagawa-ku, Tokyo, Japan).

Working Examples 1 to 5, Comparative Example 1

A decorative film including a brightening layer was fabricated according to the following procedures.

(1) Protective Layer, Semi-Transparent Metallic Layer, First Transparent Resin Layer An aqueous polyurethane solution (Resamine (trademark) D6260) was coated on a PET film for which a surface has been subjected to release treatment having a thickness of 50 μm using a knife coater and, thereafter, was heated and dried for five minutes at 120° C. Thus, a polyurethane layer having a thickness of 30 μm was formed. An acrylic adhesive solution was prepared by mixing 49.95 parts by mass of SK-Dyne (trademark) 1506BHE, 18.14 parts by mass of Jurymer (trademark) YM-5, 0.54 parts by mass of E-5XM, and 31.36 parts by mass of MIBK. The mixture was applied to a PET film. Thus, an adhesive layer having a thickness of 30 μm was formed and laminated on the previously formed polyurethane layer. Aluminum or tin was deposited at the following conditions on the surface of the side the polyurethane layer serving as the protective layer where the adhesive agent was not formed, after removing the PET that was subjected to release treatment. Thus, a vapor deposited layer was formed. The visible light transmission of the obtained laminate (semi-transparent metallic section) was measured in accordance with JIS-K-7105 and the results are shown in Table 2. Next, under the same conditions, a polyurethane layer (first transparent resin layer provided with the function of the bonding layer) having a thickness of 30 μm was coated on the vapor deposited layer. Thus, a laminate (semi-transparent section) was formed. Device: Vacuum vapor deposition system EX-400 (ULVAC, Inc., Chigasaki City, Kanagawa Prefecture, Japan)

Energy source of target metal evaporation: Electron beam

Deposition rate of vapor deposition film: 5 Angstroms/second (2) Emboss Release Film A release film was prepared in which unstretched polypropylene film having a thickness of 50 μm was disposed on both sides of a PET film having a thickness of 50 μm. A die A engraved with an emboss pattern for which the maximum depth of the convexities and concavities was 25 μm, and a die B engraved with an emboss pattern for which the maximum depth of the convexities and concavities was 15 μm were prepared. These dies were heated and pressed against the release film and, thus, a release film having each emboss pattern was formed.

(3) Second Transparent Resin Layer

An aqueous polyurethane solution was prepared by mixing 93.85 parts by mass of Resamine (trademark) D6260, 0.99 parts by mass of Resamine (trademark) D28, 0.47 parts by mass of Surfynol (trademark) 104E, and 4.69 parts by mass of IPA. The obtained aqueous polyurethane solution was applied thinly, using a knife coater, to the surface of the emboss release film, and was heated and dried for five minutes at 120° C. Thus, a second transparent resin layer of polyurethane was formed. The thickness of the second transparent resin layer was 3 μm.

(4) Brightening Layer (Tin Vapor Deposition Film)

A tin vapor deposition film was deposited on the surface of the second transparent resin layer under the following conditions to form the brightening layer. The formed brightening layer had a concavo-convex surface.

Device: Vacuum vapor deposition system EX-400 (UL-VAC, Inc., Chigasaki City, Kanagawa Prefecture, Japan)

Energy source of target metal evaporation: Electron beam

Deposition rate of tin vapor deposition film: 5 Angstroms/second

Thickness of tin vapor deposition film: 43 nm (430 Angstroms)

(5) Polyurethane Base Layer

The aqueous polyurethane solution used to form the second transparent resin layer was applied on the tin vapor deposition film having the concavo-convex surface using a knife coater, and was heated and dried for five minutes at 120° C. Thus, a polyurethane base layer having a thickness of 20 μm was formed. The storage modulus of the polyurethane base layer was in a range of $1.1 \times 10^8$ Pa to $6.2 \times 10^6$ Pa at a temperature range of 110° C. to 150° C. when measured under the conditions of a frequency of 10 Hz and stretching mode.

(6) Acrylic Adhesive Layer

An acrylic adhesive solution was prepared by mixing 49.95 parts by mass of SK-Dyne (trademark) 1506BHE, 18.14 parts by mass of Jurymer (trademark) YM-5, 0.54 parts by mass of E-SXM, and 31.36 parts by mass of MIBK. The obtained acrylic adhesive solution was applied to a release-treated PET film (ACW200), and was heated and dried for five minutes at 120° C. Thus, an acrylic adhesive layer having a thickness of 40 μm was formed.

thickness from the convex portion apex of the brightening layer to the bottom portion of the semi-transparent metallic layer was 33 μm.

Using TOM at a molding temperature of 135° C., the obtained decorative film was adhered to a base article (PC/ABS sheet (CK43 black, manufactured by TechnoPolymer Co., Ltd., Minato-ku, Tokyo, Japan)) such that the area stretching ratio was 100%. Thus, an article was formed. The appearance of the decorative film that was applied to the article was visually examined and the results thereof are shown in Table 2. The flip-flop properties were evaluated by whether change of appearance and disappearance (flip-flop) were occurred by viewing angle changes from 30 degrees to 90 degrees (Refer to a figure above the photo in FIG. 4) and how large area the flip-flop was observed at. They were evaluated using 4 ranks. "Not good" means that flip-flop was not observed, "Good" means that flip-flop was observed, "Very Good" means that flip-flop was clearly observed, and "Excellent" means that flip-flop was clearly observed at a large area of the article. For Example, the photo of the article in FIG. 4 shows the appearance of example 5 ranked as "Excellent". Visual effects of stereoscopic effects were evaluated by whether stereoscopic effects were recognized or not. Every example and comparative example exhibits the stereoscopic effects. They were evaluated using 2 ranks. "Good" means that good stereoscopic effects were recognized. "Very good" means that very good stereoscopic effects were recognized.

TABLE 2

| | Working Example 1 | Working Example 2 | Working Example 3 | Comparative Example 1 | Working Example 4 | Working Example 5 |
|---|---|---|---|---|---|---|
| Vapor deposition material of semi-transparent metallic layer | Al | Al | Al | Al | Sn | Sn |
| Visible light transmission (%) | 40.9 | 48.3 | 64.5 | 72.2 | 17.4 | 26.1 |
| Flip-flop properties Die A | Very good | Good | Good | Not good | Good | Very good |
| Flip-flop properties Die B | Very good | Good | Good | Not good | Very good | Excellent |
| Stereoscopic effect | Excellent | Excellent | Excellent | Excellent | Excellent | Excellent |

(7) Acrylic Primer Layer

An acrylic primer solution was prepared by mixing 8.57 parts by mass of Polyment (trademark) NK-350 and 91.43 parts by mass of methyl isobutyl ketone. The obtained acrylic primer solution was applied on the polyurethane base layer using a wire bar such that a dried thickness would be 7 μm, and was dried at room temperature.

(8) Laminating of Acrylic Adhesive Layer

The acrylic adhesive layer was laminated on the acrylic primer layer using a roll laminator while heated at 50° C. Then, the emboss release film was removed and the aqueous polyurethane solution used to form the second transparent resin layer was applied on the second transparent resin layer having the concavo-convex surface using a knife coater. Thus, a smooth second transparent resin layer was formed. The concavo-convex shape smooth second transparent resin layer was heated and dried for five minutes at 120° C. and, thus, a laminate (inner relief section) was formed.

(9) Decorative Film

The polyurethane layer of the first transparent resin layer of the laminate (semi-transparent metallic section) was laminated on the second transparent resin layer of the laminate (inner relief portion) using a roll laminator while heated at 50° C. Thus, a decorative film was obtained. The thickness of the decorative film was 150 μm, and the Upon examination of the appearance of the articles, appearance exhibiting stereoscopic effect and flip-flop properties was likewise recognized after TOM molding as well. The decorative films of Working Examples 1 to 5 can be advantageously applied to a molded interior part of an automobile or the like using a vacuum molding method such as TOM or the like.

Working Examples 5 to 12

A decorative film including a brightening base layer was fabricated according to the following procedures.

(1) Protective Layer, Semi-Transparent Metallic Layer, First Transparent Resin Layer As in Working Example 1, a laminate (semi-transparent metallic section) was formed. The visible light transmission of the obtained laminate (semi-transparent metallic section) was measured in accordance with JIS-K-7105 and the results are shown in Table 3.

(2) Emboss Release Film

A release film was prepared in which unstretched polypropylene film having a thickness of 50 μm was disposed on both sides of a PET film having a thickness of 50 μm. A die C engraved with an emboss pattern for which the maximum depth of the convexities and concavities was 25 µm was prepared. These dies were heated and pressed against the release film and, thus, a release film having an emboss pattern was formed.

(3) Polyurethane Brightening Base Layer

A lustrous aqueous polyurethane solution was prepared by mixing 100 parts by mass of Resamine (trademark) D6260, 0.99 parts by mass of Resamine (trademark) D28, 0.47 parts by mass of Surfynol (trademark) 104E, 3 parts by mass of EMR-D6390, and 4.69 parts by mass of IPA. The obtained lustrous aqueous polyurethane solution was applied so as to fill in the convex portions of the emboss release film having the concavo-convex surface using a knife coater, and was heated and dried for five minutes at 120° C. Thus, a polyurethane brightening base layer having a thickness of 25 µm was formed. The storage modulus of the polyurethane brightening base layer was in a range of $1.1 \times 10^8$ Pa to $6.2 \times 10^6$ Pa at a temperature range of 110° C. to 150° C. when measured under the conditions of a frequency of 10 Hz and stretching mode.

(4) Acrylic Primer Layer

The acrylic primer solution obtained in Working Example 1 was applied on the polyurethane brightening base layer using a wire bar such that a dried thickness would be 7 µm, and was dried at room temperature.

(5) Laminating of Acrylic Adhesive Layer

The acrylic adhesive layer obtained in Working Example 1 was laminated on the acrylic primer layer using a roll laminator while heated at 50° C. Then, the emboss release film was removed. The aqueous polyurethane solution used to form the second transparent resin layer in Working Example 1 was applied on the polyurethane brightening base layer having the concavo-convex surface using a knife coater, the polyurethane brightening base layer was smoothed, and was heated and dried for five minutes at 120° C. Thus, a laminate (inner relief section) was formed.

(6) Decorative Film

The polyurethane layer of the first transparent resin layer of the laminate (semi-transparent metallic section) was laminated on the smoothed polyurethane brightening base layer of the laminate (inner relief portion) using a roll laminator while heated at 50° C. Thus, a decorative film was obtained. The thickness of the decorative film was 150 µm, and the thickness from the convex portion apex of the brightening layer to the bottom portion of the semi-transparent metallic layer was 30 µm.

Using TOM at a molding temperature of 135° C., the obtained decorative film was adhered to a base article (ABS) such that the area stretching ratio was 100%. Thus, an article was formed. The appearance of the decorative film that was applied to the article was visually examined and the results thereof are shown in Table 3.

The decorative films of Working Examples 5 to 12 also can be advantageously applied to a molded interior part of an automobile or the like using a vacuum molding method such as TOM or the like.

The invention claimed is:

1. A decorative film comprising:
   a base layer;
   a brightening layer having a concavo-convex surface characterized by concave areas and convex areas that smoothly transition into each other, as a separate body on the base layer or as a single body with the base layer;
   a transparent resin layer on or above the brightening layer, wherein the transparent resin layer has an average transmittance in the visible light region that is 80% or greater; and
   a semi-transparent metallic layer having a substantially flat surface shape, on or above the transparent resin layer, wherein the decorative film exhibits a flip-flop appearance, and
   wherein a storage modulus of at least one of the base layer or the brightening layer as a single body with the base layer and storage modulus of the transparent resin layer are each from $1 \times 10^6$ Pa to $1.5 \times 10^8$ Pa in a temperature range of 110° C. to 150° C. when measured under conditions of a frequency of 10 Hz and stretching mode.

2. A decorative film according to claim 1, comprising:
   a brightening base layer including a brightening material dispersed in a binder resin, wherein the base layer and the brightening layer are a single body.

3. The decorative film according to claim 1, wherein:
   the brightening layer is provided on the base layer as a separate body; and
   a visible light transmission of the semi-transparent metallic layer is from 10% to 70%.

4. The decorative film according to claim 2, wherein:
   a visible light transmission of the semi-transparent metallic layer is from 15% to 75%.

5. The decorative film according to claim 1, wherein:
   the brightening layer is provided on the base layer as a separate body; and
   a thickness of the brightening layer is from 10 nm to 100 µm.

6. The decorative film according to claim 1, wherein:
   a depth of the concavo-convex surface is from 1 µm to 100 µm.

7. The decorative film according to claim 1, wherein:
   a thickness of the transparent resin layer from a convex apex of the concavo-convex surface to a bottom surface of the semi-transparent me
   tallic layer is from 10 to 500 µm.

TABLE 3

|  | Working Example 5 | Working Example 6 | Working Example 7 | Working Example 8 | Working Example 12 | Working Example 9 | Working Example 10 | Working Example 11 |
|---|---|---|---|---|---|---|---|---|
| Vapor deposition material of semi-transparent metallic layer | Al | Al | Al | Al | Sn | Sn | Sn | Sn |
| Visible light transmission (%) | 40.9 | 48.3 | 64.5 | 72.2 | 17.4 | 26.1 | 36.3 | 51.4 |
| Flip-flop Die C properties | Very good | Excellent | Very good | Good | Good | Good | Very good | Good |
| Stereoscopic effect | Good | Good | Good | Good | Good | Good | Good | Good |

Upon examination of the appearance of the articles, appearance exhibiting stereoscopic effect and flip-flop properties was likewise recognized after TOM molding as well.

8. The decorative film according to claim 1, wherein:
   the brightening layer is provided on the base layer as a separate body; and the brightening layer is a metal thin film comprising a metal selected from aluminum, nickel, gold, platinum, chromium, iron, copper, tin, indium, silver, titanium, lead, zinc, and germanium, or an alloy or compound of the same.

9. The decorative film according to claim 2, wherein:
the brightening material is an aluminum brightening material or a pearl brightening material.

10. The decorative film according to claim 1, further comprising:
a protective layer on or above the semi-transparent metallic layer, wherein
a storage modulus of at least one of the base layer or the brightening base layer and the transparent resin layer and the protective layer is from $1 \times 10^6$ Pa to $1.5 \times 10^8$ Pa in a temperature range of 110° C. to 150° C. when measured under conditions of a frequency of 10 Hz and stretching mode.

11. A decorative film comprising:
a base layer;
a brightening layer having a concavo-convex surface characterized by concave areas and convex areas that smoothly transition into each other, as a separate body on the base layer or as a single body with the base layer;
a transparent resin layer on or above the brightening layer, wherein the transparent resin layer has an average transmittance in the visible light region that is 80% or greater; and
a semi-transparent metallic layer having a substantially flat surface shape, on or above the transparent resin layer, wherein the decorative film exhibits a flip-flop appearance, wherein:
a storage modulus of the base layer or the brightening base layer as a single body with the base layer and storage modulus of the transparent resin layer are each from $1 \times 10^6$ Pa to $1.5 \times 10^8$ Pa in a temperature range of 110° C. to 150° C. when measured under conditions of a frequency of 10 Hz and stretching mode.

12. A decorative film comprising:
a base layer;
a brightening layer having a concavo-convex surface characterized by concave areas and convex areas that smoothly transition into each other, as a separate body on the base layer or as a single body with the base layer;
a transparent resin layer on or above the brightening layer, wherein the transparent resin layer has an average transmittance in the visible light region that is 80% or greater;
a semi-transparent metallic layer having a substantially flat surface shape, on or above the transparent resin layer, wherein the decorative film exhibits a flip-flop appearance; and
a protective layer on or above the semi-transparent metallic layer, wherein:
a storage modulus of the base layer or the brightening base layer as a single body with the base layer, storage modulus of the transparent resin layer, and storage modulus of the protective layer are each from $1 \times 10^6$ Pa to $1.5 \times 10^8$ Pa in a temperature range of 110° C. to 150° C. when measured under conditions of a frequency of 10 Hz and stretching.

13. The decorative film of claim 1, wherein the transparent resin layer has an average transmittance in the visible light region that is 90% or greater.

14. The decorative film of claim 1, wherein the transparent resin layer has a concavo-convex first surface and a substantially flat second surface.

15. The decorative film of claim 14, wherein the concavo-convex first surface directly contacts the brightening layer and the substantially flat second surface directly contacts the semi-transparent metallic layer.

16. The decorative film of claim 2, wherein the brightening material is compounded into the binder resin in an amount of from 0.1 mass % to 12 mass % of the overall mass of the brightening material and binder resin.

17. The decorative film of claim 16, wherein the brightening material is compounded into the binder resin in an amount of from 0.3 mass % to 5 mass % of the overall mass of the brightening material and binder resin.

18. The decorative film of claim 1, wherein the semi-transparent metallic layer is capable of reflecting or transmitting the visible light rays depending on angle of incidence.

19. The decorative film of claim 18, wherein the visible light transmission of the semi-transparent metallic layer is from 15% to 75%.

20. The decorative film of claim 18, wherein the semi-transparent metallic layer has a thickness of from 0.1 nanometers to 50 nanometers.

* * * * *